3,292,345
PROCESS FOR CONVERTING COKE OVEN
AMMONIA AND HYDROGEN SULFIDE
Gunther Wunderlich, Sterkrader Str. 37, Bottrop, Germany, and Heinrich Weber, Lenaustrasse 2, Recklinghausen, Germany
Filed June 25, 1963, Ser. No. 292,190
4 Claims. (Cl. 55—46)

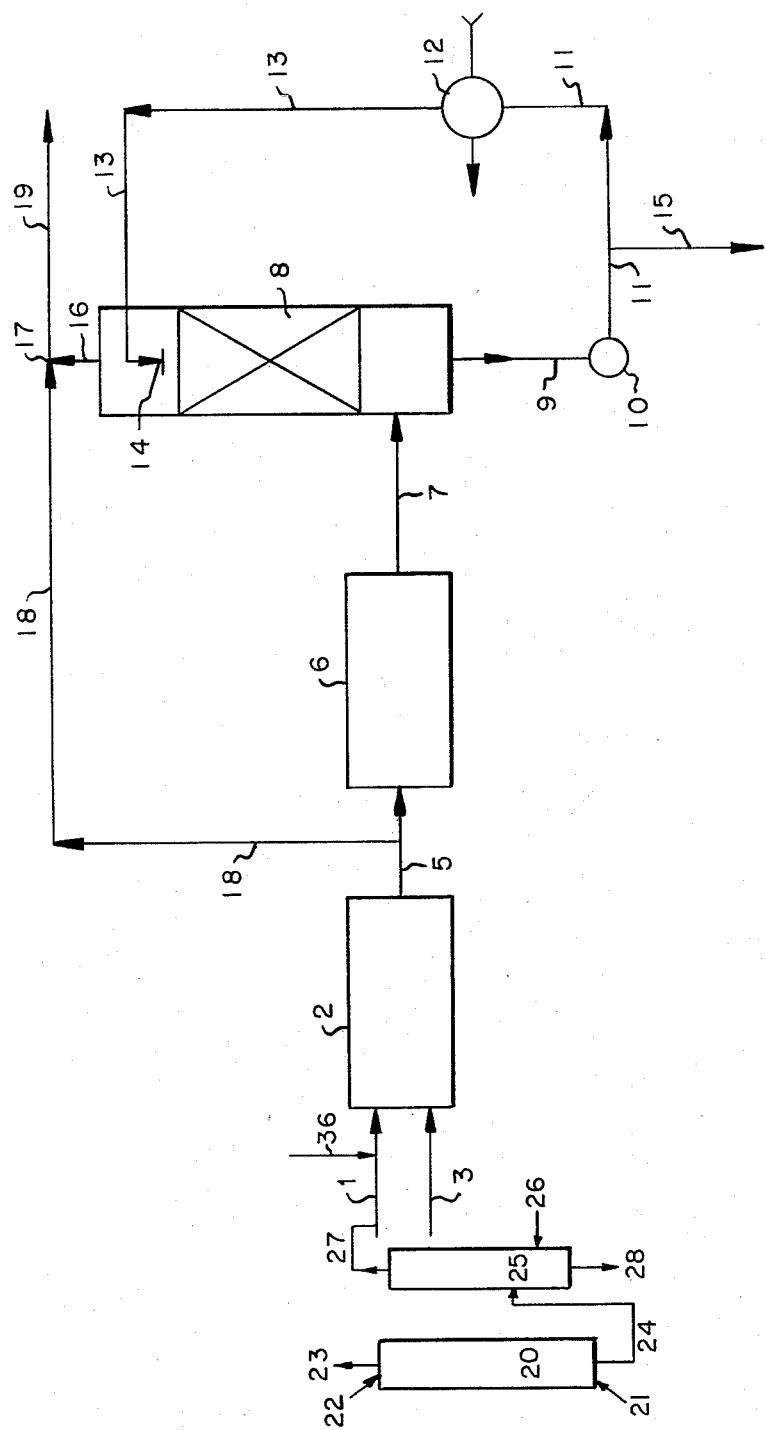

In purifying the distillation gases of coke oven plants a considerable quantity of ammonia containing water is obtained from which the ammonia is recovered by different processes usually in the form of salts, in most cases in the form of ammonium sulphate.

The recovery of ammonium salt is technically disadvantageous due to the corroding properties of the strong acids of generally inorganic nature to which the ammonia is bonded. Moreover, the equipment needed for giving the salt its crystal form, so that it may be used as fertilizer, for example, is very expensive.

The technical and economical problems arising in connection with converting the ammonia into ammonium sulphate have been described in detail in the manual by Grosskinsky, Handbuch des Kokereiwesens, Dusseldorf 1958, vol. 2, pages 59 to 60. Here it has also been pointed out that although hydrogen sulphide contained in the coke oven gas has been used for producing sulphuric acid, the problem of removing the ammonia remains to be solved.

The free ammonia has to be removed from the waters before they pass as waste water into the rivers.

The ammonia-containing waters have also been used for the purpose of quenching hot coke, and numerous suggestions have been made for destroying the ammonia in this way. However, all these known processes have the disadvantage that either ammonia or some other badly smelling or even poisonous compounds in the ammonia, such as phenols, sulphides, rhodanides, are taken up by the coke, or that ammonia and its partly undesirable and poisonous components are discharged into the atmosphere, which is contrary to the public drive against air pollution. In view of the above mentioned facts the processes already known to the art cannot be recommended and are probably the reason why they have not been applied.

It has also been proposed to blow the ammonia-steam vapors separated from the waters by means of heat, into lean-gas producers, which are installed in some coke oven plants for producing under-firing gas. In this case the ammonia is decomposed in the gas generator into nitrogen and steam.

In the waters of coke oven plants the ammonia is always more or less bonded to hydrogen sulphide. This leads in connection with the described processes to the substantial disadvantage that simultaneously with the decomposition or respectively the burning off of the ammonia, sulphur compounds are obtained such as sulphur dioxide, which are passed into the atmosphere.

Furthermore, this part of the hydrogen sulphide is no longer available for the recovery of sulphuric acid.

This applies in particular when according to known methods, the ammonia is removed from the coke oven gas by means of scrubbing with water and the greater part of the hydrogen sulphide is removed by wet-scrubbing with ammonia water. The vapors contain besides hydrogen sulphide practically the entire amount of free ammonia. Even by prolonging the scrubbing time extremely, the hydrogen sulphide is separated from the ammonia only to an unsatisfactory degree, so that when such vapors are charged into the lean-gas producer, large amounts of sulphur dioxide are present in the waste gases of the coke ovens which are then lost for the production of sulphuric acid.

According to other proposals the formation of ammonia in the coke oven is to be prevented so to say "in statu nascendi" by adding catalysts to the coking coal or the ammonia formed in the coke is to be decomposed in the coke oven gas by passing it over hot carrier substances such as incandescent coke.

All these proposals for the removal or destruction of the ammonia contained in the coke oven gas have not been successful because their introduction into coke oven practice met with great technical difficulties and the expenditure involved was not balanced out in any way by the value received for instance in the form of energy.

The process according to the present invention overcomes these technical difficulties and offers, furthermore, the advantage that in addition to the removal of the ammonia, energy is recovered, for instance in the form of high-pressure steam, or it is possible to use the heat obtained by burning the ammonia in some other form, for heating purposes or for generating high calorie gases.

It is the primary object of this invention to recover the heat energy of combusted hydrogen sulphide.

It has been found that the decomposition of the ammonia present in the coke oven gases and obtained by scrubbing with water and of the ammonia obtained in aqueous condensates may be effected in such a way that the vapors enriched by ammonia and hydrogen sulphide, obtained by known indirect ammonia recovery processes, are burnt, as are also the vapors from ammonia water which is to a great extent free of hydrogen sulphide and is taken from any desired point of the process, which vapors have been enriched only with ammonia and are received by desorption with ammonia free gases and/or by steam, and the heat produced by burning the ammonia is used for generating steam or for heating coke ovens, air heaters for blast furnaces, blast furnaces proper, steel mill and foundry ovens, or the vapors are used as a component in producing gas in gas generators or gas generating plants.

The special advantage of the new process consists in that ammonia and hydrogen sulphide may be burnt off together in the combustion oven, normally present in coke oven plants for burning the hydrogen sulphide vapors. A special installation is neither required for this process nor for the subsequent catalytic oxydation of the sulphurous acid to sulphur trioxide, nor for the next step of the process—the condensation. With existing installations a marketable sulphuric acid of 70 to 80 percent can be produced by the novel process, when it is taken into account that by burning off the ammonia much more steam is produced than would be required for producing an acid of 70 to 80 percent.

For this reason the surplus part of the water is condensed after recovering part of the heat as steam behind a waste heat vessel before the catalytic oxydation. The condensation may be eliminated, if the combustion gases are to be treated to produce according to known processes, diluted sulphuric acid or sulfur.

According to this invention the necessary waste heat vessels are constructed considering the greater heat quantities which are to be discharged according to the novel process, compared to the normal wet catalysis plant, i.e. the vessels have to be designed for nearly double to triple the steam production.

It is not necessary that all the combustion gas is passed through the waste heat vessel, but if favorable for the control of the temperatures of the combustion gases which are to be passed to the catalytic oxydation and if a respective low percentage sulphuric acid is to be produced, a partial stream of up to 50 percent may be by-passed around the waste heat vessel and led again into the cooled combustion gas stream after the waste heat vessel.

The surplus steam present in the combustion gases is separated from the recycled cooling water as an aqueous condensate at a temperature as high as possible, as for instance up to 80° C., because in this way only a minor loss of sulphurous acid occurs.

The burning of the ammonia together with hydrogen sulphide does not shown any further effects. The nitric oxide content of the produced acid is practically not higher than it would be without burning off the ammonia in this process.

It was found further that the condensing out of the amount of water required is effected most advantageously by cooling the already precooled burnt gases, having a temperature of 320 to 500° C., first in a direct cooler, to a temperature of 60 to 90° C. saturating them at the same time with water steam, and then in an indirect vertical tube cooler, arranged directly above the direct cooler, to a tempertaure of 20 to 50° C. This procedure would work in the following way:

Liquid condensate is received in the indirect cooler, which runs down into the direct cooler and meets the hot combustion gases entering at the bottom of the direct cooler. The hot gases effect a vaporization of part of the condensate, cool down and become saturated with steam. They enter the indirect cooler, whereby they are cooled down to a temperature considerably below their dew point and the condensate for charging the direct cooler is separated.

The combustion gas, cooled down to a temperature of approximately 20 to 50° C., leaves the indirect cooler saturated with water steam, whereas surplus aqueous condensate not vaporized by the hot combustion gases, is collected in the sump of the direct cooler and is discharged.

The special advantage of the novel cooling process resides in the fact that by employing this procedure it is possible to reduce the sulphur dioxyde content of the discharged condensate to 0.2 to 0.5 gram per liter, compared to a sulphur dioxyde content of about 5 to 8 grams per liter in the discharged water when applying conventional direct cooling with water.

In special cases, when for instance compared to the amount of ammonia only small amounts of hydrogen sulphide are obtained, it may become necessary to increase the ignition quality of the mixture.

According to the invention this may be done by the admixture of for instance coke oven gas or other conbustible gases to the vapors to be burnt. In this case correspondingly greater quantities of water must be separated from the vapors before applying catalytic oxidation.

According to a special form of the new process, elementary sulphur is burnt in the same oven for the promotion or stabilization of the combustion. The equipment required for this purpose can easily be installed in known ways into the normally used hydrogen sulphide combustion ovens.

According to another form of the new process oxygen may also be added to the combustion air for the stabilization of the combustion.

The amount of combustion air added should most effectively be such that there is a mole-ratio of $SO_2:O_2=1$ in the combustion gases.

The new process is explained in more detail by the following comparison test and the attached FIGURE 1 of the drawing.

*Comparison test*

A coke oven plant produced per hour 75,000 Nm.³ of coke oven gas of normal composition with 7.0 grams $H_2S$ and 6.0 grams of free ammonia per Nm.³.

The ammonia was completely removed from the gas by scrubbing with water, the hydrogen sulphide to 80 percent by scrubbing with ammonia.

The decarbonator vapors from the so-called wet scrubbing process had a temperature of 70° C. and the following composition:

| | Nm.³/h. |
|---|---|
| $H_2S$ | 278 |
| $H_2O$ | 510 |
| $NH_3$ | 595 |
| $CO_2$ | 255 |
| HCN | 42 |
| Naphthalin | 4 |
| | 1684 |

FIGURE 1 shows the further treatment of the vapors schematically.

Coke oven gas enters the scrubber 20 by means of line 21 and is freed of its content of $NH_3$ and $H_2S$ by scrubbing with water, which is fed into the scrubber by line 22. The scrubbed gas is discharged by line 23 from the scrubber. The scrubbing water, enriched with $H_2S$ and $NH_3$, leaves the scrubber by means of line 24 and enters the desorber 25. Steam is fed to the desorber by line 26. The desorbed water is withdrawn by means of line 28. The $H_2S$ and $NH_3$ enriched vapors leave the desorber by means of line 27. Line 27 is then connected with line 1. Through conduit 1 the 1,684 Nm.³ of vapors of the aforementioned composition are led to the combustion oven 2. Through conduit 3 6,294 Nm.³ of air containing 154 Nm.³ of steam are supplied to a combustion oven 2. Through conduit 5 7,907 Nm.³ of combustion gases leave the oven 2, of which 6,093 Nm.³ enter the waste heat vessel 6 in which 3.4 tons of steam per hour with 18 atm. g. are produced. Through conduit 7 the gases which are cooled down to a temperature of 320° C. leave the waste heat vessel, condensation takes place and the condensed water containing minor quantities of $SO_2$ having a temperature of 66° C. is discharged by means of conduit 9 and recycled water having a temperature of 66° C. is discharged by means of conduit 9 and is delivered by means of pump 10 and conduit 11 to the indirect cooler 12. The condensed and cooled water leaving the latter with a temperature of 35° C. through conduit 13 is charged again into the cooler 8 at its top through a distribution device 14.

Through conduit 15 a quantity of 953 kg. of water per hour containing 6 kg. of $SO_2$ and having a temperature of 66° C. condensed in the indirect cooler 12 is not needed for the production of sulfuric acid, therefore being in surplus is drawn off and so excluded from recycling. The combustion gases are leaving the direct cooler 8 through conduit 16 having a temperature of 30 to 40° C. and meet at 17 with 1,814 Nm.³ of combustion gases which have been led through the by-pass line 18. The combustion gases discharged through conduit 19 have a temperature of 400 to 450° C. and are processed in a normal way to sulphuric acid, whereby an amount of 1,522 kg. of 78% sulphuric acid is obtained.

By freeing the same quantity of vapors of the same composition from the ammonia in known ways in a saturator and recovering subsequently sulphuric acid therefrom, only 1.4 tons of steam of 20 atmospheres effective pressure and 1,522 kg. of 78% sulphuric acid were obtained. If desired fuel gas can be added through line 36 to the ammonia and hydrogen sulfide containing vapors entering into the oven 2 by means of line 1 in order to support the burning.

The effect of the special method of cooling the combustion gases precooled in waste heat vessels according to the present invention may be explained by way of an example.

Through inlet sleeve are admitted into the direct cooler 1,370 Nm.³ of precooled combustion gases having a temperature of 400° C. The operating pressure of the plant is 1,000 mm. W.S. and the water content of the combustion gases is 300 kg. The gases are cooled down to a temperature of 78° C. in the direct cooler and become saturated with steam, taking up 270 kg. of steam. In this condition the gases go into the indirect cooler, into which cooling water is fed by means of conduit, which is discharged again through conduit. The gases having a temperature of 35° C. and a water content of 45 kg. leave the indirect cooler through conduit. In the tubes of the indirect cooler 525 kg. of water are condensed. The condensate then flows down from the top onto the direct cooler, and 270 kg., as mentioned above, are vaporized by the hot gases. The rest amounting to 255 kg. leaves the sump of the direct cooler through conduit, having a temperature of 80° C. and a content of sulphur dioxide of 0.35 gram per liter.

Hitherto no suggestions have been made about how to proceed if it should be desired to use the combustion head of the ammonia for heating steam generators, coke ovens, wind heaters for blast furnaces, blast furnaces themselves, steel works or mill ovens, or if it is desired to decompose the ammonia to nitrogen and hydrogen, without adding hydrogen sulphide.

This presents the problem of having to separate the ammonia and the hydrogen sulphide contained in the coke oven gases, so that afterwards the ammonia containing now only minor amounts of hydrogen sulphide may be burned.

For this technical problem the present invention offers also a solution in that the ammonia water obtained at any stage by known indirect ammonia scrubbing processes, freed to a great extent of acid components, especially hydrogen sulphide, is subjected to a desorption process with ammonia-free underfiring gases like coke oven gas, or waste gases of refineries, blast furnace gas, air and/or steam respectively, whereafter the gas or vapors loaded with ammonia are used as a heating medium in the heating flues of coke ovens, steam generators, wind heaters for blast furnaces, blast furnaces themselves, steel works or mill ovens, or are used in gas generators or other gas generating plants or a gas component.

The water obtained thereby is freed from ammonia to such a large extent that it may be passed to drainage without any further treatment. If required, it can also be recycled, partly or completely, to the scrubbing plant, where it is used again for the scrubbing of ammonia from the coke oven gases.

Ammonia containing aqueous condensates obtained from the coke oven gases will be processed further in known ways together with the scrubbing water.

The new process may be applied within the scope of the known ammonia-hydrogen sulphide recycling process, in that ammonia water is taken from any chosen point in the process, and the desorption of the ammonia is effected.

But the novel process may also be applied in combination with any other so-called indirect process, whereby at the same time the hydrogen sulphide may be scrubbed out, or it may be eliminated from the coke oven gas subsequently at another point by scrubbing, for instance with aqueous solutions containing potash, arsenic compounds or solutions containing organic amino acids or by treatment with solid masses, for instance finely dispersed solid phases containing iron and/or aluminum compounds.

The hydrogen sulphide may be recovered in already known ways as sulphuric acid or elementary sulphur.

When applying the new process within the scope of the known ammonia-hydrogen sulphide recycling scrubbing process or some other already known so-called indirect scrubbing process where also, for instance, only the ammonia is scrubbed out of the coke oven gas, the scrubbing of the ammonia may be effected by extending the contact time of coke oven gas and scrubbing medium beyond the normal time applied for the combined scrubbing of hydrogen sulphide and ammonia, so that a more or less extensive bonding of the ammonia to the carbon dioxide contained in the coke oven gas is the result. In the desorption stage also the carbon dioxide is then driven off together with the ammonia and is taken up into the vapors.

By varying the contact times it is possible, depending upon given circumstances, for instance depending upon the desired heating value of the desorption gases, to leave a greater or smaller quantity of carbon dioxide in the surplus coke oven gas.

According to the invention, the combustion heat of the ammonia is used directly for heating purposes, and no combustion gases are formed containing considerable quantities of acid components, for instance sulphur dioxide. The hydrogen sulphide content in the coke oven gas is separated previously from the ammonia to a large extent and processed further separately. The surplus coke oven gas may be processed according to known methods to long-distance gas.

To remove the ammonia from the scrubbing medium as completely as possible the desorption gas may be preheated.

Another possibility is to preheat the ammonia containing scrubbing medium before the desorption.

Furthermore, the partial pressure of the ammonia and thus the degree of desorption may be increased in known ways by adding stronger alkalies or alkaline earths respectively to the ammonia water before or during the desorption.

According to a special form of the novel process the preheating of the gases to be used for the desorption and/or the preheating of the ammonia containing scrubbing medium may be effected by heat exchange with the compression heat of the compressed coke oven gas. For this reason it would be necessary to install the gas exhausters after the scrubbing systems for removing hydrogen sulphide, ammonia, and perhaps benzol hydrocarbons from the coke oven gas. It is advisable to superheat subsequently the ammonia-laden gases in order to avoid corrosion in gas lines due to the accumulation of aqueous condensates containing ammonia and carbon dioxide.

It has furthermore been found that it can be of advantage to carry through only part of the desorption and to leave, in general, a small portion of the ammonia in the treated water. In this case it is appropriate to lead the aqueous effluent of the desorption column into a distillation column after having been preheated in a heat exchanger with the ammonia-free waste water discharged from the sump of this distillation column. The top vapors of this column will be condensed and the condensation heat used as it is desired, while the ammonia containing condensate is fed into the washing cycle at any point chosen.

The use of other combustible gases besides coke oven gas may be applied for the purpose of desorbing the ammonia from the water, for example the use of air laden with ammonia as combustion medium in other applications besides in the heating flues of coke ovens presumes that installations such as blast furnaces or its blast heaters, steam boiler plants, steel works or steel mill ovens, also oil refineries where combustible gases are produced are situated at such a convenient distance from the ammonia desorption plant, that the costs involved for the technical use of these waste gases are relatively low.

What is claimed is:

1. A process for the conversion of ammonia and hydrogen sulfide contained in coke oven gases to substantially avoid air pollution comprising scrubbing said coke oven gases with water to obtain water enriched with ammonia and hydrogen sulfide, desorbing the enriched water with steam to obtain vapors enriched with ammonia and hydrogen sulfide, burning with air the ammonia and hydrogen sulfide enriched vapors to produce combustion gases and precooling the combustion gases in a waste heat vessel to produce steam, passing precooled combustion gases to a direct cooler wherein the gases are contacted with water and steam is separated from the contacted water.

2. The process of claim 1 wherein fuel gases are added to the ammonia and hydrogen sulfide enriched vapors prior to burning.

3. The process of claim 1 wherein an excess of oxygen is added to the ammonia and hydrogen sulfide enriched vapors prior to burning.

4. The process of claim 1 wherein the said coke oven gases are further scrubbed with ammonia liquor to absorb hydrogen sulfide, and desorbing the hydrogen sulfide.

References Cited by the Examiner

UNITED STATES PATENTS

| | | | |
|---|---|---|---|
| 2,720,280 | 10/1955 | Doyle | 55—73 |
| 2,750,331 | 6/1956 | Meyers | 55—32 |
| 2,756,841 | 7/1956 | Asendorf | 55—73 |
| 3,020,138 | 2/1962 | Wethly | 55—70 |
| 3,104,959 | 9/1963 | Grosskinsky et al. | 55—70 |
| 3,106,192 | 10/1963 | Hingst | 122—7 |

FOREIGN PATENTS 241,515   12/1962   Australia.

REUBEN FRIEDMAN, *Primary Examiner.*

B. NOZICK, *Assistant Examiner.*